(12) United States Patent
La Macchia et al.

(10) Patent No.: US 8,582,540 B2
(45) Date of Patent: Nov. 12, 2013

(54) POWER MANAGEMENT IN A WIRELESS AD HOC NETWORK

(75) Inventors: Michael P. La Macchia, Gilbert, AZ (US); Mark L. Wormley, Scottsdale, AZ (US); Keith Palermo, Gilbert, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 412 days.

(21) Appl. No.: 12/981,248

(22) Filed: Dec. 29, 2010

(65) Prior Publication Data

US 2012/0170468 A1 Jul. 5, 2012

(51) Int. Cl.
*H04J 3/00* (2006.01)
*H04W 4/00* (2009.01)
*H04L 12/28* (2006.01)

(52) U.S. Cl.
USPC ........... 370/336; 370/338; 370/345; 370/389; 370/392

(58) Field of Classification Search
USPC ................ 370/331, 338, 345, 389, 392
See application file for complete search history.

(56) References Cited

U.S. PATENT DOCUMENTS

| | | | |
|---|---|---|---|
| 7,228,106 B2 | 6/2007 | Choi | |
| 7,672,263 B2 | 3/2010 | Sinivaara | |
| 7,747,273 B2 | 6/2010 | Chou | |
| 2006/0098655 A1* | 5/2006 | Zeira et al. | 370/389 |
| 2007/0008916 A1* | 1/2007 | Haugli et al. | 370/320 |
| 2007/0211686 A1* | 9/2007 | Belcea et al. | 370/345 |
| 2007/0274206 A1 | 11/2007 | Habetha et al. | |
| 2008/0075123 A1* | 3/2008 | Fourcand | 370/503 |
| 2008/0132264 A1 | 6/2008 | Krishnamurthy et al. | |
| 2008/0151801 A1 | 6/2008 | Mizuta | |
| 2008/0261614 A1* | 10/2008 | Mia et al. | 455/456.1 |
| 2009/0061799 A1 | 3/2009 | Park et al. | |
| 2009/0207801 A1* | 8/2009 | Morton et al. | 370/329 |
| 2010/0014503 A1* | 1/2010 | Shukla et al. | 370/345 |
| 2010/0046484 A1* | 2/2010 | Elliott | 370/337 |
| 2010/0157955 A1* | 6/2010 | Liu et al. | 370/336 |
| 2011/0096863 A1* | 4/2011 | Lee et al. | 375/295 |

OTHER PUBLICATIONS

Viredaz, et al., Energy Management on Handheld Devices, Aug. 28, 2003, II pages, ACM Queue 2003.
Hahn et al, Power Reduction in JTRS Radios With ImpacctPro, 7 pages, downloaded Oct. 5, 2010 from www.ece.uci.edu/~jhahn/pdf/milcom04.pdf.

* cited by examiner

*Primary Examiner* — Brandon Renner
(74) *Attorney, Agent, or Firm* — Schmeiser, Olsen & Watts LLP; Lowell W. Gresham; Charlene R. Jacobsen

(57) ABSTRACT

In a wireless ad hoc network (20) of nodes (22), a method (64) of power management entails monitoring (82) a current traffic load of the network (20), and in response to the current traffic load, selecting (106, 132) a subset (102) of epochs (80) within cyclically repeating time windows (78) for network communication. A message (122) is communicated (120) between the nodes (22) in the network (20). The message (122) identifies the subset (102) of epochs (80) for using in communicating network traffic (32). Following receipt of the message, each of the nodes (22) modifies (124) a transmit capability mode by entering a run state (40) during the epochs (80) within the subset (102) to enable communication of network traffic (32) and by entering a low power consumption idle state (42) during the remaining epochs (80) within the time window (78).

18 Claims, 8 Drawing Sheets

POWER MANAGEMENT IN A WIRELESS AD HOC NETWORK

TECHNICAL FIELD OF THE INVENTION

The present invention relates to the field of wireless ad hoc networks. More specifically, the present invention relates to managing power consumption by nodes within a wireless ad hoc network.

BACKGROUND OF THE INVENTION

Over recent years, the market for wireless communications has enjoyed tremendous growth. Wireless technology now reaches or is capable of reaching virtually every location on earth. This rapid growth in wireless communication technology and portable computing platforms has led to significant interest in the design and development of instantly deployable, wireless networks often referred to as "ad hoc networks" for both military and commercial applications.

In a wireless ad hoc network, mobile user nodes are linked within a limited geographical region, and all nodes participating in the ad hoc network operate cooperatively to forward data packets and determine whether the packets were successfully delivered from the original source to the final destination. A wireless ad hoc network has a number of advantages over cellular networks. For example, a wireless ad hoc network does not require infrastructure such as base stations or access points, and it does not require any centralized administration or control. As such, an ad hoc network can be entirely self-organizing between the mobile nodes that form the network. Thus, an ad hoc network can change position and shape in real time (i.e., dynamically) in order to adapt to a changing situational environment, such as a military operation, in times of emergency, such as earthquake, fire, or power interruption, and so forth.

In order to self-organize and operate cooperatively to forward information, all wireless nodes in an ad hoc network must continuously process and forward network information (e.g., data, voice, etc). In addition, all nodes in an ad hoc network must continuously send and receive routing overhead messages in order to maintain network connectivity. To support these operations, battery powered portable networking nodes in an ad hoc network continuously discharge their batteries. Consequently, users of such nodes are compelled to carry additional batteries and/or to use larger batteries to maintain connectivity to the ad hoc network for a given mission duration. Not only is it inconvenient to carry an additional quantity of batteries, it is highly undesirable in situations where mobility, weight reduction, and an individual's load carrying capacity are fundamental to mission success.

Thus, it would be desirable to have a power management scheme in a wireless ad hoc network that reduces power consumption at individual wireless nodes without sacrificing network responsiveness to changes in network traffic activity or network capability.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Embodiments of the invention entail methodology and a system for managing power consumption in a wireless ad hoc network. In particular, the methodology and system extend battery life of wireless mobile nodes within the ad hoc network without sacrificing responsiveness or network capability. Power management is fundamentally achieved by identifying and avoiding wasted power. Thus, time periods are created in which a wireless node can enter a low power consumption state so that power consumption is effectively reduced. The reduction of wasted power in this manner enhances the ability of the wireless mobile nodes to remain in-network performing their assigned role. By reducing wasted power, battery life can be extended. Therefore, savings is achieved in terms of size and weight of the wireless mobile nodes since fewer batteries and/or smaller batteries can be used. Additionally, a reduction in power consumption reduces a node's thermal signature thereby increasing its operating life and making it less detectable to thermal imaging systems.

Figure 1:
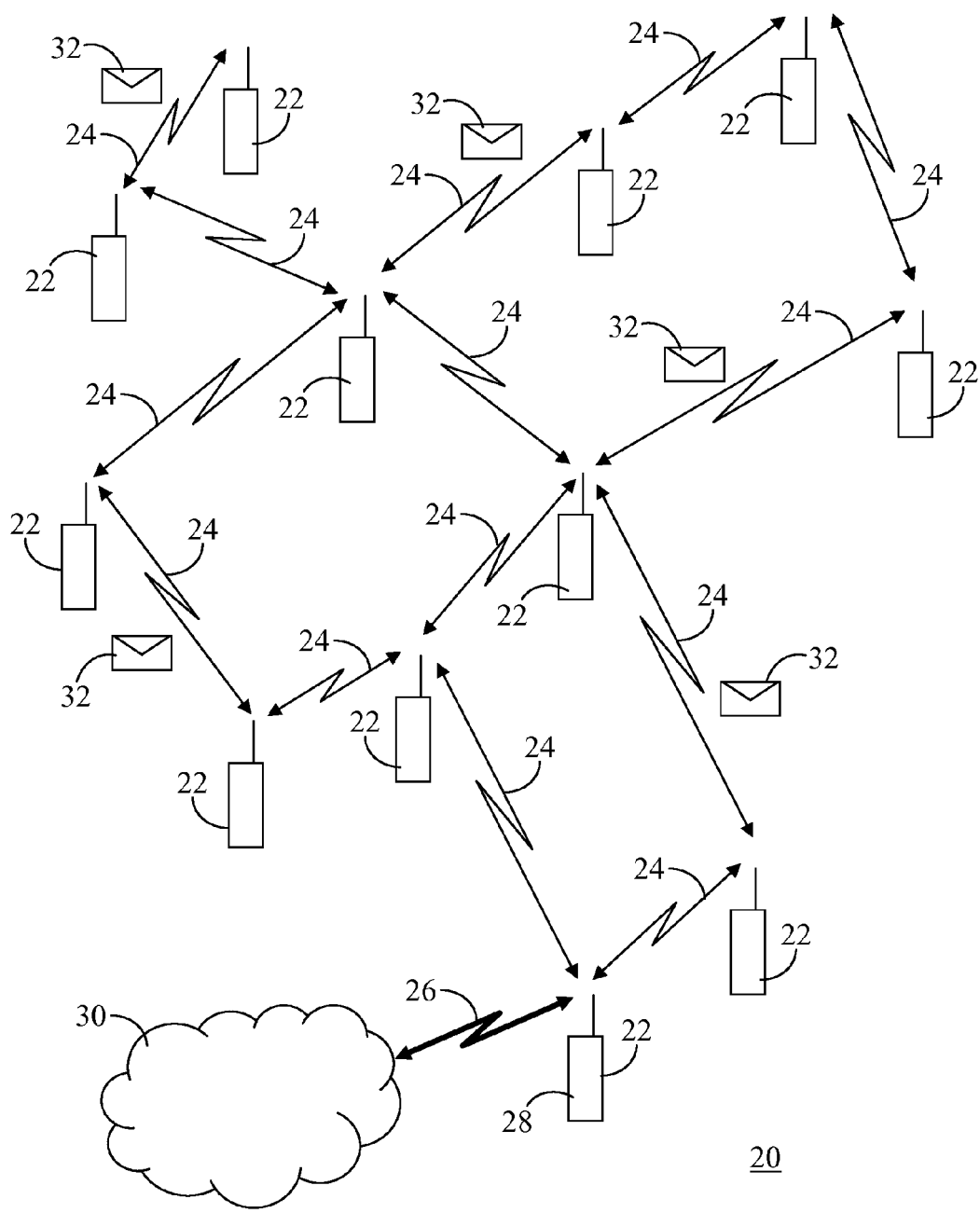
FIG. 1 shows a block diagram of an exemplary wireless ad hoc network in which an embodiment of the invention may be implemented.

FIG. 1 shows a block diagram of an exemplary wireless ad hoc network 20 in which an embodiment of the invention may be implemented. Exemplary wireless ad hoc network 20 includes a plurality of wireless radio devices, referred to herein as nodes 22. Nodes 22 are configured for communication within wireless network 20, i.e., intra-network communication, over wireless links 24. That is, wireless links 24 carry network traffic as distinct bitstreams between the particular ones of nodes 22 and others of nodes 22 within ad hoc network 20 in accordance with particular routing solutions. Wireless links 24 may be implemented using any suitable networking waveform, e.g., a wideband networking waveform (WNW), a soldier radio waveform (SRW), or another developed or upcoming networking waveform solution.

At least one of nodes 22 may additionally be configured for communication outside of network 20, i.e., extra-network communication. This extra-network communication is represented by a wireless channel 26 between a gateway node 28 and an extra-network location, represented as a cloud element 30. Gateway node 28 provides ingress and egress into the local domain of nodes 22.

Ad hoc network 20 may be composed of multiple domains of nodes 22, each deployed in a hierarchical relationship. Nodes 22 within any domain of ad hoc network 20 can be a mixture of vehicle based and portable battery powered nodes, and network traffic can include sensor data, voice, position data, and the like. Each of nodes 22 participates in network 20 by transporting network traffic, represented by packets 32 communicated within network 20 via wireless links 24. Network traffic 32 entails both network overhead traffic and user data including, for example, voice and position information.

In certain operational scenarios, such as in a military application, nodes 22 may be lightly loaded (i.e., have a low volume of network traffic 32) a majority of the time. However, there may be bursts of higher activity (i.e., a high volume of network traffic 32) interspersed within the given period of time. Wireless ad hoc network 20 may be defined and organized to provide bandwidth, also referred to herein as network capacity, sufficient to support the bursts of higher activity. However, these bursts of higher activity may occur occasionally. Thus, full bandwidth capacity may only be utilized infrequently. Accordingly, while it may be critical to mission success to have a given network capacity to support network communication, power consumption by nodes 22 to maintain this capacity may be undesirably high when the network capacity isn't fully being utilized.

Figure 2:
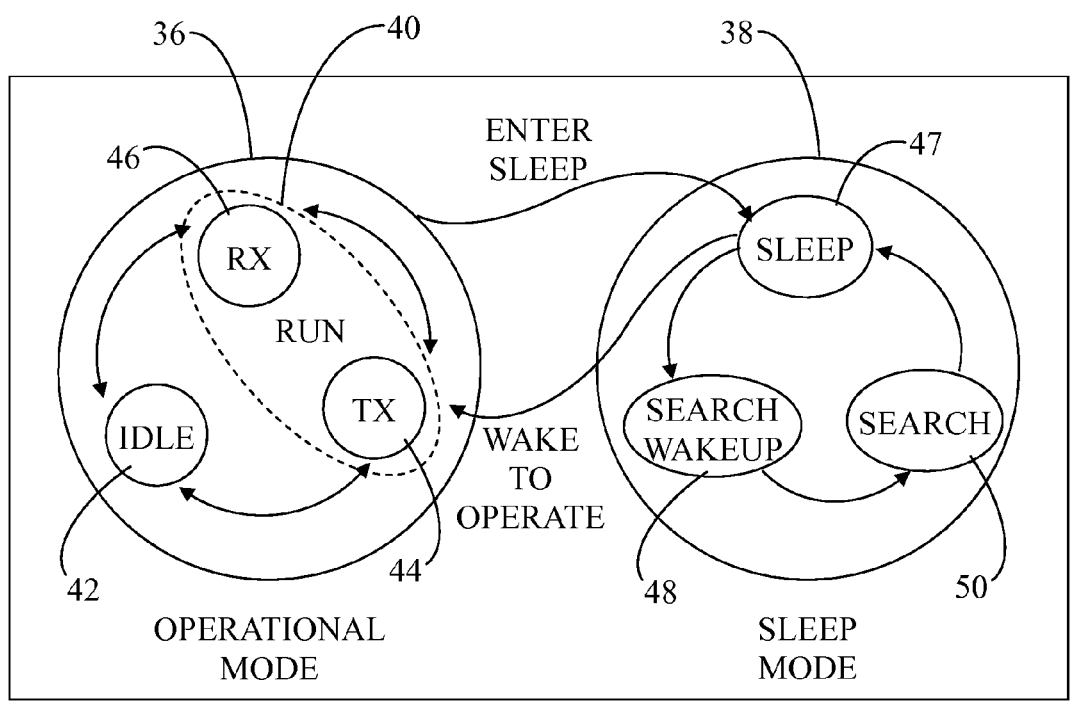
FIG. 2 shows a state diagram for a wireless node that may be utilized within the ad hoc network.

FIG. 2 shows a state diagram 34 for a wireless node 22 that may be utilized within the ad hoc network 20. A number of strategies have been developed to reduce power consumption at wireless nodes 22 by periodically placing nodes 22 in a lower power mode, such as an idle state or a sleep state. By way of example, as illustrated in FIG. 2, each of nodes 22 may be capable of functioning in either of two fundamental modes. These two fundamental modes can be an operational mode 36 and a sleep mode 38. In operational mode 36, node 22 is capable of operation within network 20 in which network traffic 32 (FIG. 1) can be passed between nodes 22.

In an exemplary scenario, operational mode 36 can include a run state 40 and an idle state 42, where run state 40 can further be subdivided into a transmit state 44 and a receive state 46. When node 22 enters idle state 42, it neither receives nor transmits network traffic 32 (e.g., overhead messages or user data). Whereas, when node 22 enters run state 40, it is instantaneously capable of receiving and/or transmitting network traffic 32. Power consumption by node 22 in idle state 42 is typically much lower than when node 22 is in run state 40 since node 22 neither receives nor transmits network traffic 32 in idle state 42.

Like idle state 42, sleep mode 38 also refers to a low power consumption mode for node 22. However, in sleep mode 38, certain elements (e.g., oscillator, voltage regulator, transceiver, etc.) of node 22 may be turned off so that node 22 enters a sleep state 47 in order to minimize power consumption. Accordingly, power consumption by node 22 in sleep mode 38 can be significantly less than power consumption by node 22 in idle state 42.

Aside from power consumption, a notable difference between idle state 42 and sleep mode 38 is that of latency, i.e., the time delay experienced by node 22 to either enter or exit run state 40. In wireless ad hoc network 20, this time delay can affect whether node 22 remains "in-network" (i.e., is recognized as a member of ad hoc network 20) or whether node 22 becomes "extra-network" (i.e. node 22 is no longer recognized as a member of ad hoc network 20).

In idle state 42, node 22 is neither transmitting nor receiving, but since multiple elements of node 22 are not powered down in idle state 42, an interrupt can result in transition from idle state 42 to run state 38 with a very short transition delay. Thus, in idle state 42, node 22 can maintain network connectivity with the remainder of nodes 22 in ad hoc network 20. That is, node 22 in idle state 42 can remain "in-network," and will be recognized as such by the remainder of nodes 22.

In contrast, when node 22 is in sleep mode 38, node 22 may lose network connectivity with remaining nodes 22 in ad hoc network 20. A transition from sleep state 47 to run state 40 may occur as a result of a realtime clock alarm, i.e., a search wakeup alarm 48. In response to search wakeup alarm 48, node 22 may be compelled to enter a search state 50 to power up various components that were powered down and to send overhead messages in order to reestablish network connectivity with nodes 22 of ad hoc network 20. Consequently, the transition from sleep mode 38 to run state 40 can be many times longer than the transition from idle state 42 to run state 40.

Typical networking waveforms use a time slotted structure of, for example, Time Domain Multiple Access (TDMA) and/or Carrier Sense Multiple Access (CSMA). Such a scheme allows each node 22 within ad hoc network 20 a great deal of flexibility to access the radiofrequency (RF) medium, i.e. wireless links 24 (FIG. 1), during the time slots. Time slot access is generally available on a scheduled basis or a contention access basis, such as CSMA. The unpredictability of contention based access to wireless links 24 makes power management particular challenging. Power management is difficult because all nodes 22 within network 20 need to constantly "listen" for network traffic in order to allow the network traffic to be sent on any time slot with little or no a-priori knowledge. As such, wireless network nodes 22 must continually be in receive state 46 during mission critical time periods, thereby consuming power. Moreover nodes 22 must be in receive state 46, even when nodes 22 are not currently receiving or transmitting network traffic 32 (FIG. 1).

In addition, all nodes 22 within wireless ad hoc network 20 continually participate in the network overhead that maintains connectivity among these dynamic, physically moving network nodes 22. As nodes 22 move about, they exchange messages with each of their neighboring nodes 22 to track the most favorable wireless links 24 in order to maintain constant contact to their local neighbor nodes 22. Likewise, these local wireless links 24 allow network 20 to compute routing solutions between all neighboring nodes 22 and gateway nodes 28 which provide ingress and egress to the local domain of the wireless ad hoc network 20. The constant requirement to participate in maintaining the network routing solution further complicates power management because the individual nodes 22 need to continually be in run state 40 (FIG. 2) in order to send and receive overhead messages.

Consequently, it is undesirable and impractical for nodes 22 to enter sleep mode 38 during mission critical periods due at least in part to loss of network connectivity and undesirably long latencies to wake up, reestablish connectivity, and enter run state 40. Conversely, it is also undesirable to remain constantly in run state 40 due to excessive power consumption concerns.

As discussed in detail below, embodiments of the invention fundamentally achieve efficient power management by creating more periods of time for nodes 22 to be in idle state 42 so as to reduce power consumption at nodes 22. By reducing power consumption, battery life can be extended thereby resulting in a reduction in size and weight of wireless mobile nodes 22, due to a reduction in a quantity or physical size of the batteries needed to power nodes 22. However, by creating more time that nodes 22 are in idle state 42 (as opposed to sleep state 47), nodes 22 can remain in-network performing their role. Moreover, nodes 22 can rapidly transition to run state 40 as traffic load in ad hoc network 20 dictates.

Figure 3:
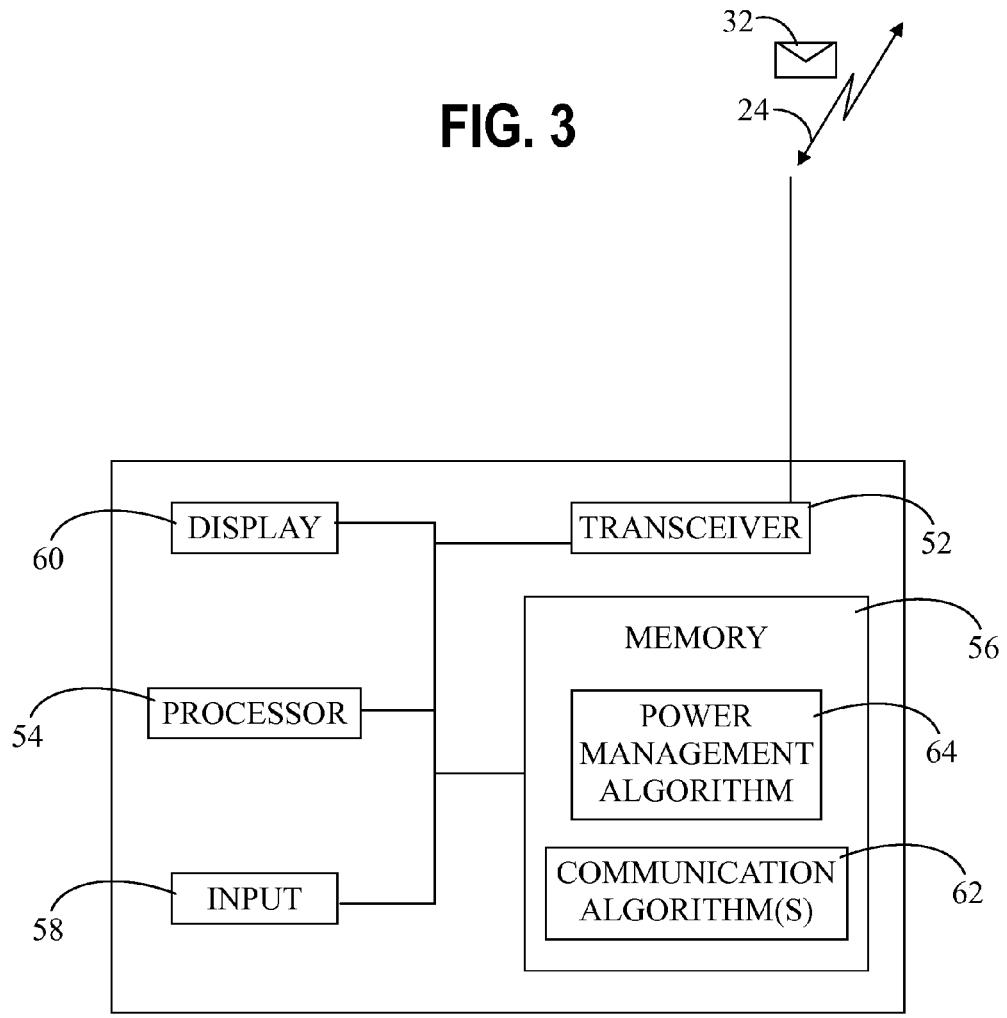
FIG. 3 shows a block diagram of a wireless node operable within the wireless network of FIG. 1.

FIG. 3 shows a block diagram of one of wireless nodes 22 (FIG. 1) operable within wireless ad hoc network 20 (FIG. 1). Node 22 may be a software definable radio system that includes, for example, a transceiver 52 configured for intra-network communication over wireless link 24. A processor section 54 is in communication with transceiver 52 and a computer-readable storage medium 56. Likewise, processor section 54 may be in communication with an input section 58 (e.g., keypad, touchscreen, microphone, sensor, and the like) and a display 60.

Computer-readable storage medium 56 may contain communication algorithms 62 executable by processor 54 that define channel modulation waveforms; modulation techniques; wideband analog-to-digital and digital-to-analog conversion; the implementation of intermediate frequency, baseband, and bitstream processing functions; and so forth. Through the execution of communication algorithms 62, processor 54 controls the transfer of signals, i.e., network traffic 32, to and from node 22. That is, processor 54 enables forwarding of network traffic 32 as distinct bitstreams over wireless links 24 between node 22 and one or more other nodes 22 of wireless ad hoc network 20.

In accordance with an embodiment, computer-readable storage medium 56 further contains a power management algorithm 64 executable by processor 54. Processor 54 executes power management algorithm 64, referred to hereinafter as a power management process 64, to control when the transfer of signals, i.e., network traffic 32, to and from node 22 will take place. More particularly, through the execution of power management process 64, processor 54 dynamically scales the needed bandwidth of wireless links 24 in accordance with a current traffic load of wireless ad hoc network 20. This scaling of bandwidth is accomplished in order to create more periods of time that node 22 is in the lower power consumption idle state 42 (FIG. 2), while rapidly increasing the bandwidth as the network traffic load and/or network mobility dictates.

Figure 4:
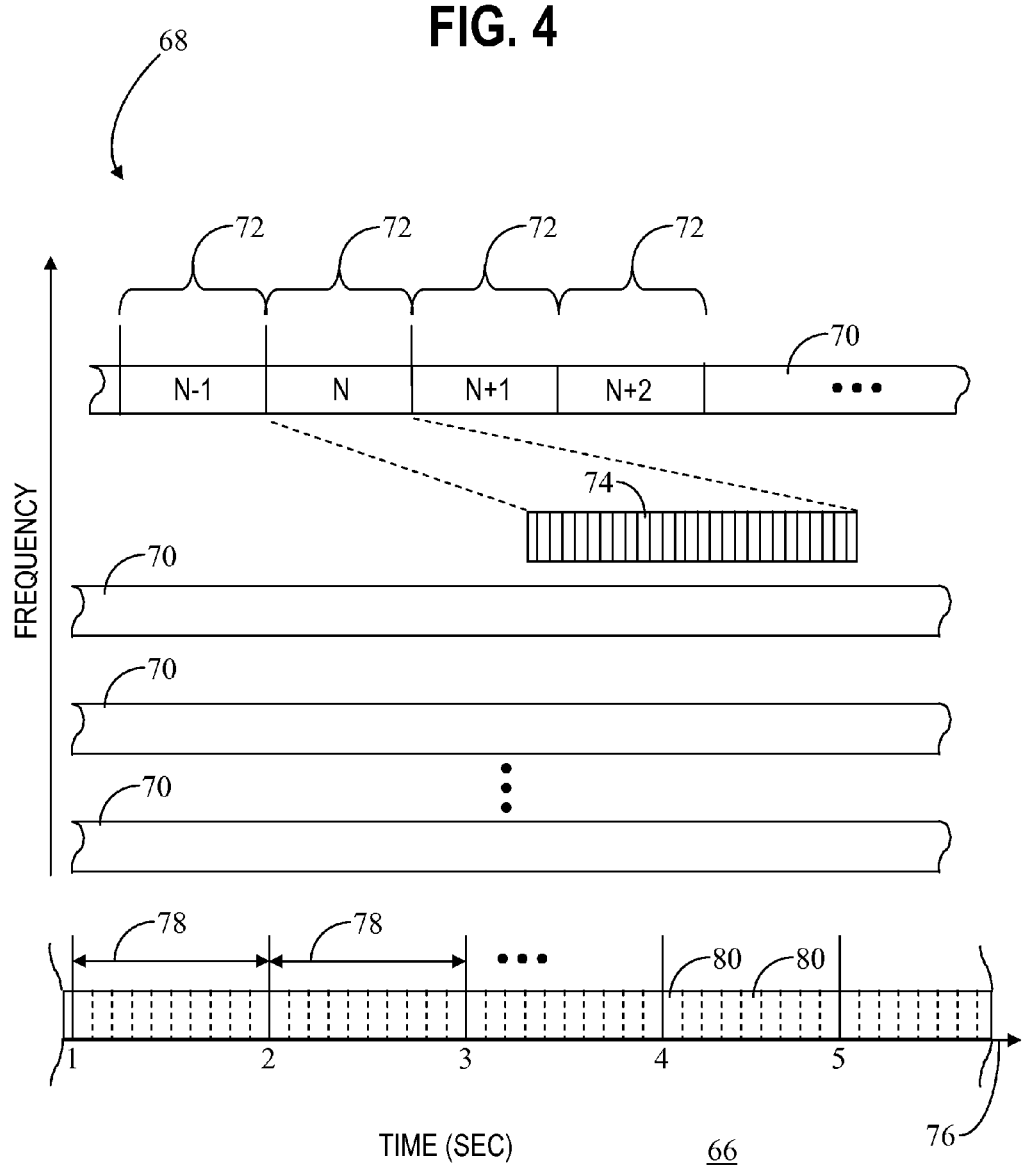
FIG. 4 shows an exemplary time-frequency graph of communication resources that may be accessible by wireless nodes within the wireless ad hoc network.

FIG. 4 shows an exemplary time-frequency graph 66 of communication resources 68 that may be accessible by wireless nodes 22 and utilized within wireless ad hoc network 20 (FIG. 1). In this exemplary embodiment, communication resources 68 may include multiple frequency channels 70 which may be utilized for control, data, and voice transmission in accordance with known and developing networking waveform methodologies.

In some embodiments, frequency channels 70 may be divided into fixed intervals in time, known as frames 72, illustrated in conjunction with one of frequency channels 70. Frames 72 may be divided into one or more timeslots 74 (illustrated in conjunction with one of frames 72) in accordance with a particular time slotted structure implemented within the networking waveform technique for wireless ad hoc network 20. Timeslots 74, each of which accommodates a single burst of information, may be utilized for network traffic 32 (FIG. 1), such as overhead messages and/or user data.

Network traffic 32 may include network access data, configuration information of timeslots 74, forwarding acknowledgements, user communications from nodes 22, such as voice, status information, position data, sensor data, and so forth.

A horizontal x-axis 76 of time-frequency graph 66 provided in FIG. 4 represents time divided into successive cyclically repeating time windows 78. For example, time window 78 repeats each second. Typically, networks, such as wireless ad hoc network 20 (FIG. 1), break up these time windows 78 in shorter blocks of time referred to as epochs 80. In this example, each of time windows 78 is one second in duration, and there are ten epochs 80 in each time window 78. Network 20 communicates network traffic 32 (FIG. 1) using timeslots 74 within frequency channels 70 during time periods defined by epochs 80. Although time-frequency graph 66 shows each of the one second time windows 78 being divided into ten epochs, it should be understood that there may be a different number of epochs 80 per time window 78 (for example, one hundred epochs per second).

When ad hoc network 20 is fully loaded, network traffic 32 is communicated via frequency channels 70 during all epochs 80, thus providing one hundred percent network capacity, or bandwidth. Bandwidth refers to the maximum amount of information (e.g., bits/second) that can be transmitted via communication resources 68). However, when ad hoc network 20 is lightly loaded, communication of network traffic 32 within network 20 may take place during only a few epochs 80 per second. Indeed, when ad hoc network 20 is very lightly loaded, ninety to ninety-nine percent of the time, subdivided into epochs 80, no network communication may take place. That is, frequency channels 70 may be unused. Accordingly, in time of reduced network activity, correspondingly reduced network capacity, or bandwidth, may be used.

Network traffic 32 is communicated within ad hoc network 20 via frequency channels 70. However, in accordance with the execution of power management process 64 (FIG. 3), network traffic 32 is communicated via frequency channels 70 over established wireless links 24 (FIG. 1) during specified predetermined periods of time, i.e., during a subset of epochs 80 within each successive time window 78. Any remaining unused epochs 80 within time window 78 can then be made available for power savings, discussed below.

Figure 5:
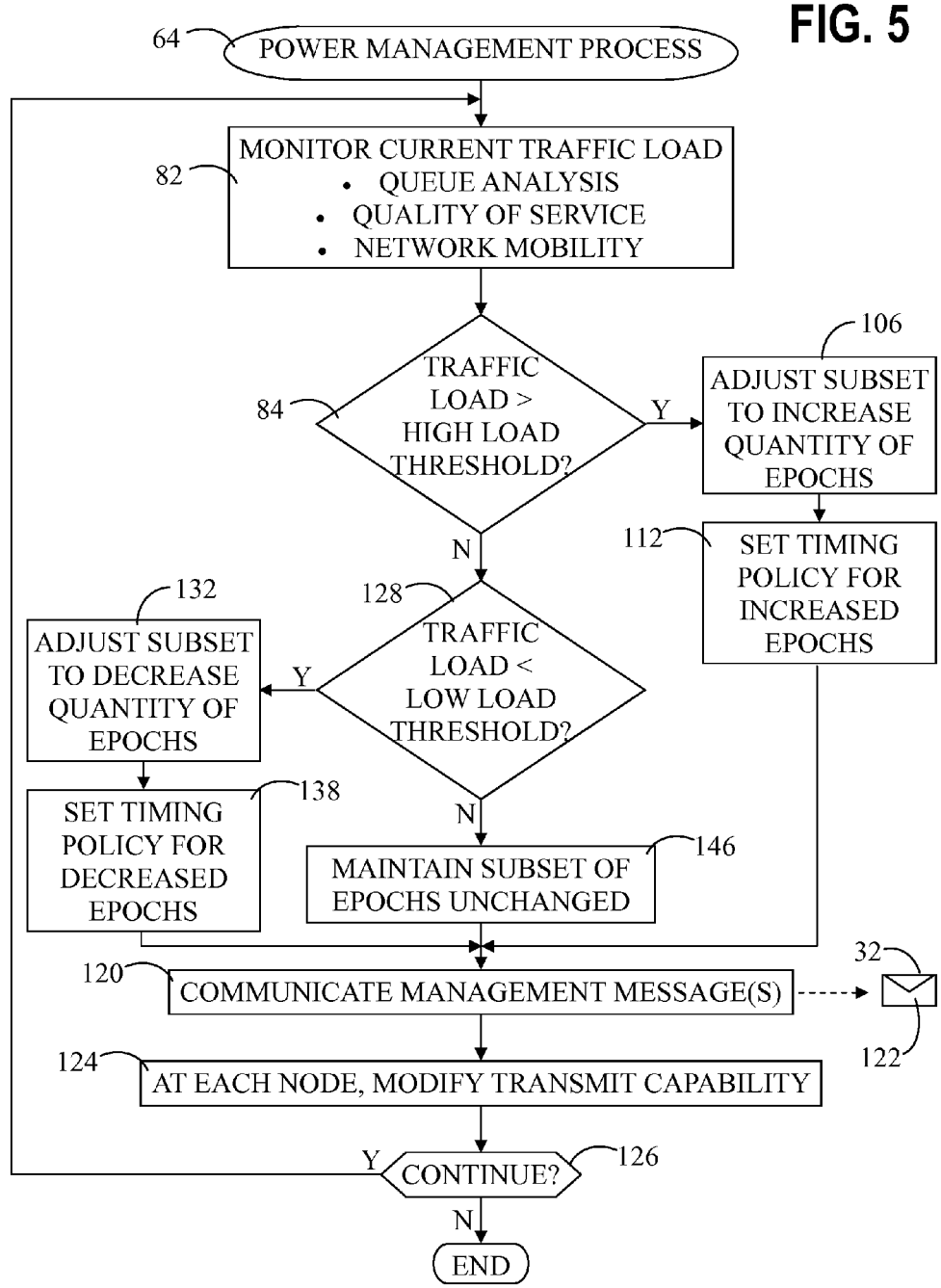
FIG. 5 shows a flowchart of a power management process in accordance with another embodiment.

Referring now to FIG. 5, FIG. 5 shows a flowchart of power management process 64. Power management process 64 is executed to determine a current traffic load of wireless ad hoc network 20 (FIG. 1) and to select a subset of epochs 80 within successive time windows 78 during which network traffic 32 may be communicated via frequency channels 70. As such, network capacity, i.e., the bandwidth, can be increased or decreased to accommodate the current traffic load of network 20.

The power management function of process 64 may be implemented in a centralized manner or in a more distributed manner. For example, in a centralized implementation, power management process 64 may be executed by only one of nodes 22 serving as a network manager. The network manager node 22 responds to conditions of changing traffic loads by sending out a message to all other nodes 22 in network 20 to change the number of active epochs 80 (FIG. 4). The terms "active epoch" or "active epochs" used herein refers to those epochs 80 during which network traffic 32 (FIG. 1) may be communicated. Conversely, "inactive epoch" or "inactive epochs" refers to the remaining epochs 80 within time window 78 during which network traffic 32 is not communicated. These inactive epochs 80 are time periods during which power savings techniques may be implemented.

In a distributed implementation, power management process 64 may be executed by each of nodes 22. Coordination of epoch adjustment may be performed as a voting action among nodes 22. Decisions regarding a change in the number of active epochs 80 may call for unanimous consent, near unanimous consent, or consent within domains, islands, or subnets of nodes 22. For simplicity of description, power management process 64 will be discussed in connection with its execution at one of nodes 22 within ad hoc network 20. However, the generalized operations of power management process 64 apply equivalently to both of the centralized and distributed implementation scenarios mentioned above.

Power management process 64 begins with a task 82. At task 82, node 22 monitors a current traffic load of wireless ad hoc network 20. The current traffic load may be monitored by acquiring knowledge, through messaging, of queue utilization of network traffic 32 (FIG. 1) at various nodes 22. For example, queue analysis may include queue fill depth versus time.

In addition, to queue analysis, the monitoring of the current traffic load and traffic load analysis may further take into account quality of service considerations (QOS) and/or network mobility. Regarding QOS considerations, the adjustment of a quantity of epochs 80 (FIG. 4) for communicating network traffic 32 can take into account the priority of network traffic 32 so as to optimize the quantity of epochs 80 used for communicating network traffic 32 when high priority network traffic 32 or network traffic 32 sensitive to latency is to be communicated. Latency sensitive network traffic 32 includes, for example, voice traffic. Lower priority network traffic 32 as represented, for example, in an IP packet QOS marking, can tolerate higher latencies and the longer queuing time that could result when a quantity of epochs 80 available for communicating network traffic 32 is reduced.

Regarding network mobility, the adjustment of a quantity of epochs 80 (FIG. 4) for communicating network traffic 32 can also take into account knowledge of the mobility of nodes 22 within wireless ad hoc network 20 (FIG. 1). When network traffic 32 demand is moderate or low, and nodes 22 are geographically immobile, the quantity of epochs 80 available for communicating network traffic 32 can be maintained low or can be reduced because the need for network topology adjustments is reduced. As nodes 22 begin to geographically move about, their rate of movement can increase the need for more frequent network maintenance. This rate of change may be used within traffic load analysis of task 82 to influence an increase in the quantity of epochs 80 available for communicating network traffic 32.

A query task 84 is performed in connection with task 82. At query task 84, a determination is made as to whether the traffic load analysis performed at task 82 indicates that the current traffic load exceeds a high traffic load threshold.

Figure 6:
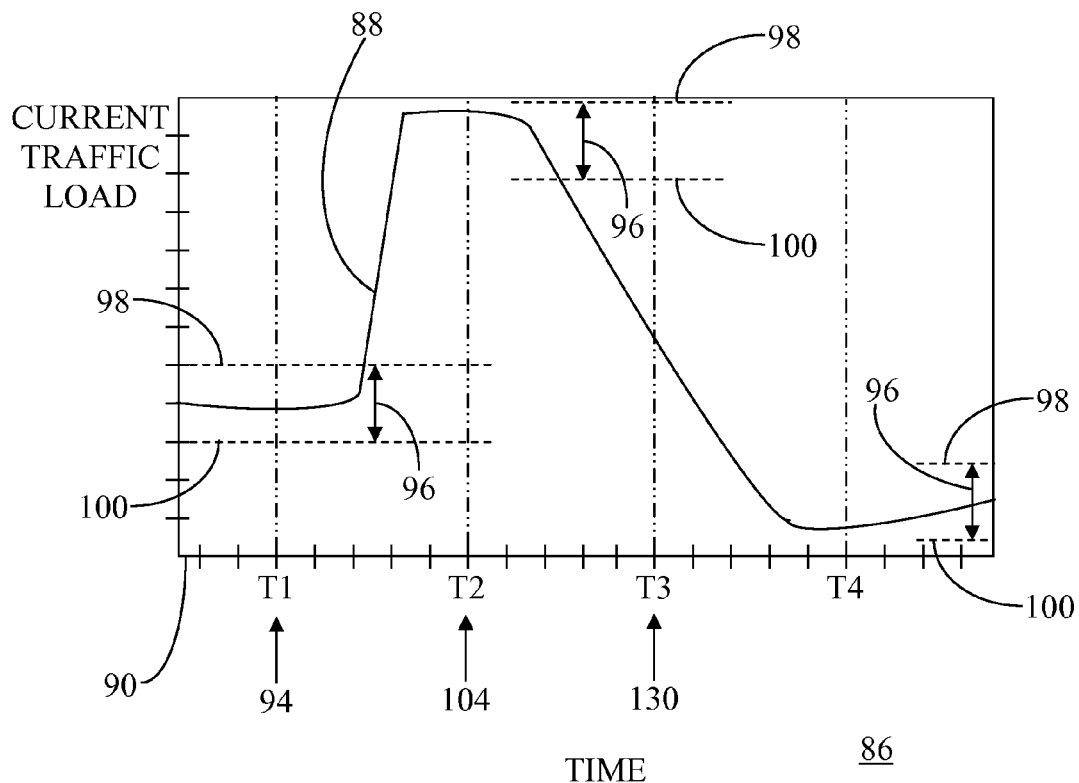
FIG. 6 shows an exemplary graph of a current traffic load parameter relative to time.
Figure 7:
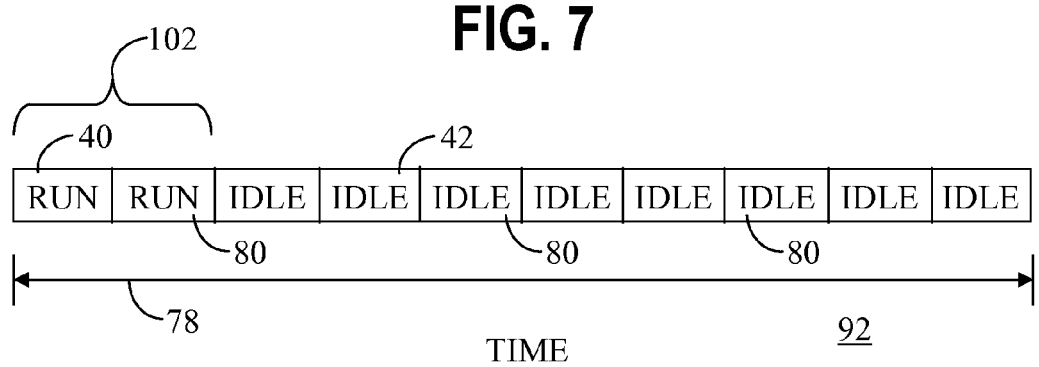
FIG. 7 shows an exemplary graph of a time window indicating those epochs which are currently available for communication of network traffic 32 within the wireless ad hoc network 20.

Referring to FIGS. 6 and 7 in connection with task 84, FIG. 6 shows an exemplary graph 86 of a current traffic load parameter 88 relative to time 90, and FIG. 7 shows an exemplary graph 92 of time window 78 indicating those epochs 80 which are currently available for communication of network traffic 32 (FIG. 1) within wireless ad hoc network 20 (FIG. 1).

In response to traffic load monitoring and analysis at task 82 (FIG. 5), current traffic load parameter 88 represents the current traffic load within network 20, and taking into account quality of service considerations and network mobility. At a first instant in time 94, labeled T1, traffic load parameter 88 falls within a traffic load window 96 delineated by a high traffic load threshold 98 and a low traffic load threshold 100.

At first instant in time 94, node 22 may have selected two of epochs 80 to be a subset 102 of epochs 80 during which network traffic 32 (FIG. 1) is to be communicated via wireless links 24 (FIG. 1) using frequency channels 70 (FIG. 7). That is, subset 102 defines a duration within successive time windows 78 during which nodes 22 within wireless ad hoc network 20 are in run state 40. Nodes 22 may enter the lower power consumption idle state 42 during the remaining epochs 80 within time window 78, in which nodes 22 abstain from communicating network traffic 32.

Thus, power savings is achieved in the example shown in FIG. 7 by placing nodes 22 in idle state 42 approximately eighty percent of the duration of time window 78. Time window 78 is one of cyclically repeating time windows, as illustrated in FIG. 4. Accordingly, the same subset 102 of epochs 80 will remain available for communication of network traffic 32 until the quantity of epochs 80 per time window 78 are increased or decreased in accordance with the execution of power management process 64. Although one power savings technique is represented by placing nodes 22 in idle state 42, different or additional power savings techniques may alternatively be implemented.

At query task 84 (FIG. 5), at a second instant in time 104, labeled T2, a determination is made that current traffic load parameter 88 exceeds high traffic threshold window 98. Accordingly, power management process 64 proceeds to a task 106.

At task 106, subset 102 of epochs 80 is adjusted or otherwise selected to accommodate the increasing traffic load. That is, a quantity of epochs 80 (FIG. 4) per successive time windows 78 (FIG. 4) that are available for communicating network traffic 32 is increased.

Figure 8:
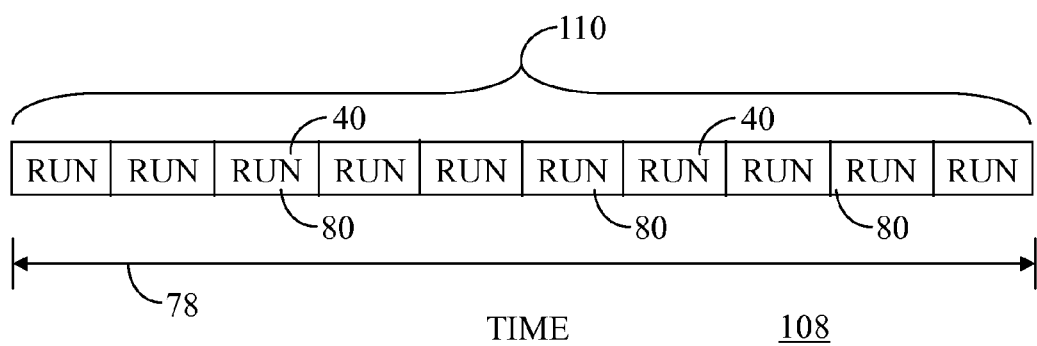
FIG. 8 shows another exemplary graph of the time window of epochs selected for communication in response to increased network traffic.

Referring to FIG. 8 in connection with task 106, FIG. 8 shows another exemplary graph 108 of time window 78 of epochs 80 selected for communication in response to increased network traffic 32. In response to task 106, a second subset 110 of epochs 80 within time window 78 is formed in response to current traffic load parameter 88 (FIG. 6) at second instant in time 104 (FIG. 6). In this example, second subset 110 of epochs 80 includes all epochs 80 within time window 78, and successive ones of the cyclically repeating time windows 78. Since communication of network traffic 32 can occur during all epochs 80, wireless ad hoc network 20 can utilize one hundred percent of its network capacity, i.e., bandwidth. However, during the time when communication can occur during all epochs 80, as specified in second subset 110, nodes 22 will not enter idle state 42 (FIG. 2) and no power savings will be achieved.

With reference back to power management process 64 (FIG. 5), a task 112 is performed in connection with task 106. At task 112, node 22 sets a timing policy for increasing the quantity of epochs 80 from first subset 102 (FIG. 7) to second subset 110 (FIG. 8) of epochs 80. In an embodiment, the rate of increase in epochs 80 to second subset 110 can be tailored for each implementation. By way of example, in critical applications, responding to an increased traffic load may require that network 20 return to one hundred percent capacity as rapidly possible.

Figure 9:
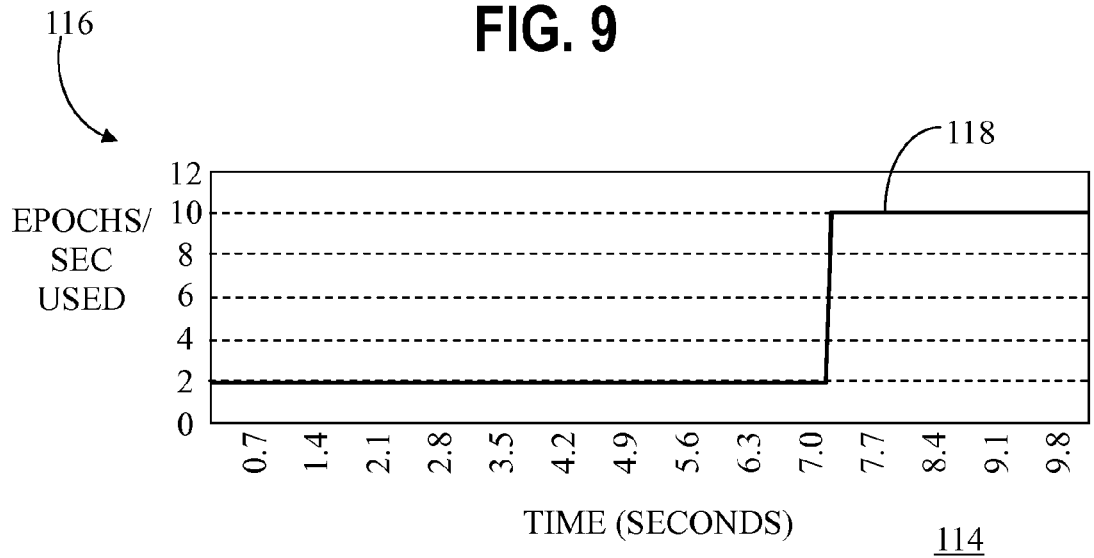
FIG. 9 shows a graph exemplifying a timing policy in which a rapid increase characteristic is implemented for increasing a quantity of epochs during which network traffic may occur.

Referring to FIG. 9 in connection with task 112, FIG. 9 shows a graph 114 exemplifying a timing policy 116 in which a rapid increase characteristic 118 is implemented for increasing a quantity of epochs 80 during which network traffic 32 may occur. As shown, timing policy 116 entails an aggressive recovery policy to enable network communication during second subset 110 (FIG. 8) of epochs 80 (FIG. 8) as quickly as possible. In this exemplary instance, the adjustment from two epochs 80 per second, as specified in first subset 102 (FIG. 7) of epochs 80, to all ten epochs 80 per second, as specified in second subset 110 (FIG. 8) of epochs 80 should be enabled in less than one second.

With reference back to power management process 64 (FIG. 5), following the execution of tasks 106 and 112, process 64 continues with a task 120.

At task 120, node 22 communicates management messages 122 as network traffic 32 to all nodes 22 within wireless ad hoc network 20. Management messages 122 can provide nodes 22 with information regarding second subset 110 (FIG. 8) of epochs 80, such as quantity of epochs 80 and the particular epochs (80), as well as timing policy 116 (FIG. 9).

Process 64 continues with a task 124. Following receipt of management messages 122, each of nodes 22 modifies its transmit capability mode by entering run state 40 (FIG. 2) to enable network communication during epochs 80 within the adjusted subset of epochs (e.g., second subset 110 illustrated in FIG. 8) and by entering a non-communication state, such as idle state 42 (FIG. 2) during the remaining ones of epochs 80 (if there are any) within the cyclically repeating time window 78.

Following task 124, power management process 64 continues with a query task 126. At query task 126, a determination is made as to whether power management process 64 is to continue. Process 64 may continue for an entire duration of a mission operation being carried out by members of wireless ad hoc network 20 (FIG. 1), and may end following that particular mission operation. Under such a circumstance, following a particular mission operation, when a determination is made at query task 126 that the execution of process 64 is to be discontinued, process 64 ends. Alternatively, when a determination is made at query task 126 that the execution of process 64 is to continue, program control loops back to task 82 to continue monitoring the current traffic load, and increase or decrease epochs 80 available for network communication in response to the current traffic load for network 20.

As discussed above, tasks 106, 112, 120, and 124 are performed when current traffic load parameter 88 (FIG. 6) is greater than high traffic load threshold 98 so as to increase a quantity of epochs 80 during which network communication can take place. However, referring back to query task 84 of process 64, when a determination is made that current traffic load parameter (FIG. 6) is not greater than high traffic load threshold 98 (FIG. 6), process 64 continues with a query task 128.

At query task 128, a determination is made as to whether the traffic load analysis performed at task 82 indicates that the current traffic load is less than a low traffic load threshold.

Referring back to FIG. 6, following second instant in time 104 and the adjustment of transmit capability to second subset 110 of epochs 80, traffic load window 96 has shifted so that high and low traffic thresholds 98 and 100, respectively, are commensurately shifted. At a third instant in time 130, labeled T3, current traffic load parameter 88 is now less than this reset low traffic load threshold 96. When current traffic load parameter 88 is less than low traffic load threshold 96, power management process 64 continues with a task 132.

At task 132, subset 110 (FIG. 8) of epochs 80 is adjusted to accommodate the decreasing traffic load. That is, a quantity of epochs 80 (FIG. 4) per successive time windows 78 (FIG. 4) that are available for communicating network traffic 32 is decreased.

Figure 10:
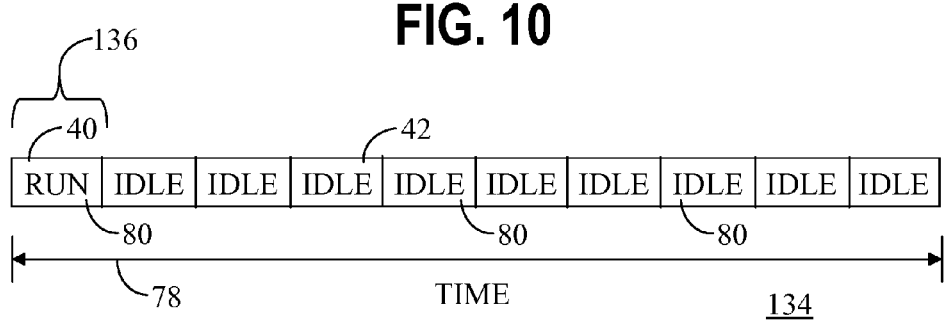
FIG. 10 shows another exemplary graph of the time window of epochs selected for communication in response to decreased network traffic.

Referring to FIG. 10 in connection with task 132, FIG. 10 shows another exemplary graph 134 of time window 78 of epochs 80 selected for communication in response to decreased network traffic 32.

In response to task 132, a third subset 136 of epochs 80 within time window 78 is formed in response to current traffic load parameter 88 (FIG. 6) at third instant in time 130 (FIG. 6). In this example, third subset 136 of epochs 80 includes only one epoch 80 within time window 78 and successive ones of the cyclically repeating time windows 78. Since communication of network traffic 32 can occur only during one epoch 80 per time window 78, ninety percent of the duration of time window 78 (i.e., nine epochs per second) is available for power savings techniques.

As shown in graph 134, ad hoc network 20 (FIG. 1) is lightly loaded. That is, there is only minimal network traffic 32 currently being communicated via wireless links 24 (FIG. 1). In this example, this single epoch 80 within third subset 136 is available for network communication that includes, at least, overhead messaging and bandwidth management messages 122. In an embodiment, the same epoch 80 in each time window 78 (FIG. 4), i.e., the same period of time, may be available for network communication to carry overhead messages, bandwidth management messages 122, and the like in order to maintain nodes (FIG. 1) in-network and to maintain, or establish, routing solutions.

With reference back to power management process 64 (FIG. 5), a task 138 is performed in connection with task 132. At task 138, node 22 sets a timing policy for decreasing the quantity of epochs 80 from, for example, second subset 110 (FIG. 8) to third subset 136 (FIG. 10) of epochs 80. That is, the rate of decrease of epochs 80 to the single epoch 80 of third subset 136 can be tailored for each implementation. For example, response to a decreased traffic load may occur gradually.

Figure 11:
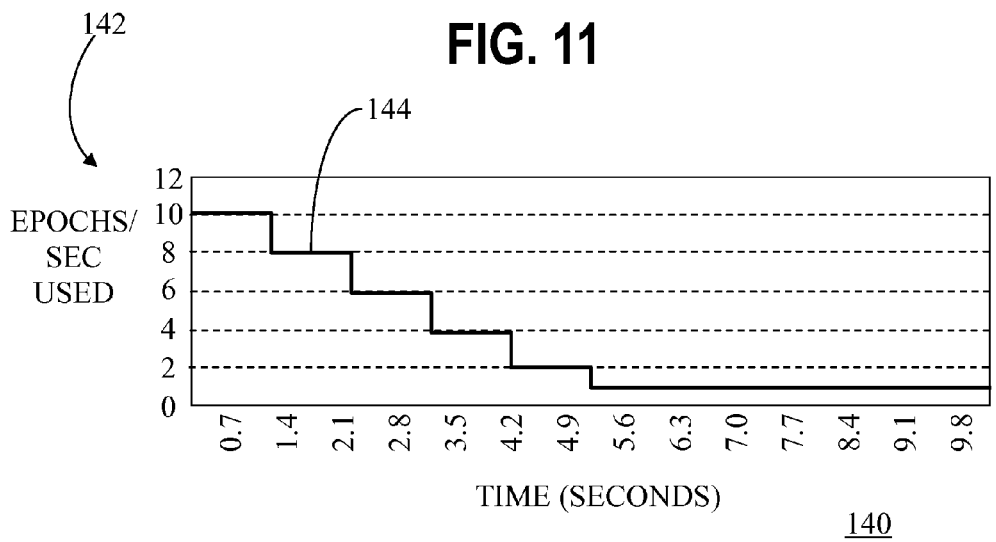
FIG. 11 shows a graph exemplifying a timing policy in which a gradual decrease characteristic is implemented for decreasing a quantity of epochs during which network communication may occur.

Referring to FIG. 11 in connection with task 138, FIG. 11 shows a graph 140 exemplifying a timing policy 142 in which a gradual decrease characteristic 144 is implemented for decreasing a quantity of epochs 80 during which network traffic 32 may occur. As shown, timing policy 142 entails a gradual decay policy to enable network communication during epochs 80 within third subset 136 (FIG. 10) of epochs 80 (FIG. 8). In this exemplary instance, the adjustment from ten epochs 80 per second, as specified in second subset 110 (FIG. 8) of epochs 80, to only one epoch 80 per second, as specified in third subset 136 (FIG. 10) of epochs 80 can be enabled in approximately five seconds.

It should be understood that graph 114 (FIG. 9) and graph 140 (FIG. 11) show only two, of many, possible responses to increased network traffic 32 and/or decreased network traffic 32). Those skilled in the art will recognize that a particular timing policy for increasing and/or decreasing epochs 80 available for network communication can be varied in accordance with particular wireless ad hoc network implementations taking into account, for example, the criticality of communication, quality of service considerations, latency, network mobility, and so forth.

Returning to power management process 64 (FIG. 5), following task 138, program control continues with tasks 120 and 124 in which bandwidth management messages 122 are communicated to all nodes 22 within wireless ad hoc network 20 with information regarding third subset 134 (FIG. 10) of epochs 80, followed by each node 22 modifying its transmit capability in accordance with third subset 136. Subsequent to the execution of tasks 120 and 124, continuation query task 126 may be performed, as discussed above.

Now returning to query tasks 84 and 128, when a determination is made at query task 84 that the current traffic load is not greater than high traffic load threshold 98 (FIG. 6) and a determination is made at query task 128 that the current traffic load is not less than low traffic load threshold 100 (FIG. 6), power management process 64 continues with a task 146. At task 146, the current subset of epochs 80 available for network communication is maintained unchanged. That is, negative responses to each of tasks 84 and 128 indicates that the current traffic load, represented by current traffic load parameter 88 (FIG. 6), falls within traffic load window 96 supportable by the subset of epochs 80 available for network communication. Therefore, the quantity of epochs 80 within time window 78 (FIG. 4) that are available for network communication need not change.

Following task 146, process 64 may simply proceed to continuation task 126, as discussed above. In addition, or alternatively, as illustrated in FIG. 5, tasks 120 and 124 may be performed, as needed, to communicate management messages 122 regarding the current subset of epochs 80 (e.g., first subset 102 (FIG. 7) available for network communication so that each of nodes 122 can verify that its transmit capability has been modified in accordance with the appropriate subset of epochs specified in management messages 122. Subsequently, continuation query task 126 may be performed as discussed above.

Figure 12:
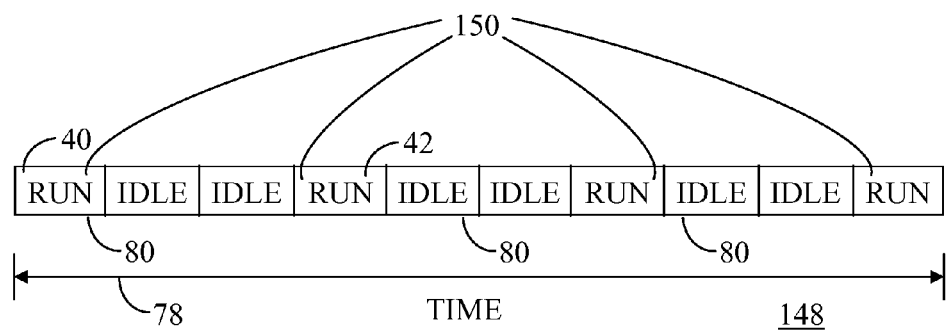
FIG. 12 shows yet another exemplary graph of the time window of epochs selected for communication of network traffic.

FIG. 12 shows yet another exemplary graph 148 of time window 78 of epochs 80 selected for communication of network traffic 32 (FIG. 1). As shown in graph 148, epochs 80 selected for inclusion in a subset 150 of epochs 80 are approximately uniformly distributed within time window 78.

Under some conditions, all epochs 80 within each time window 78 need not be selected to support network traffic 32. That is, full bandwidth is not required. However, quality of service (QOS) characteristics of network traffic 32 may call for reduced latency. Through an appropriate selection of epochs to form subset 150, latency can be kept short while still making some epochs 80 available for power savings.

Conversely, graph 92 (FIG. 7) illustrates a condition in which immediately adjacent epochs 80 within time window 78 are selected for inclusion in subset 102 (FIG. 7). Such a condition is advantageous for power savings in that elements within nodes 22 can power up, i.e., become active, in order to enter run state 40 (FIG. 2) and stay active until no longer needed during each time window 78, thereby reducing the number of power up and power down cycles.

Consequently, epochs 80 within subset 150 are selected to minimize latency with some sacrifice in power savings. Whereas, epochs 80 within subset 102 are selected to maximize power savings with some adverse impact to the latency characteristics. Thus, it should be apparent that various epoch selection schemes may be implemented in accordance with particular wireless ad hoc network implementations taking into account, for example, the tradeoff between power savings and latency.

In summary, the present invention entails methodology and a system for managing power consumption in a wireless ad hoc network by dynamically varying network capacity in favor of using less power in response to demand. In particular, a power management scheme is implemented in which time periods are formed during which a network node can enter a low power, non-communication state. These time periods are formed based on current traffic loads, and these time periods can rapidly change as a result of network traffic or mobility demands. The time spent in these lower power states can vary from one epoch in ten to as many as nine epochs in ten. This allows the network nodes to be in a lower power consumption state ten to ninety percent of the time. However, since the nodes are still sending and receiving network routing overhead messages at least one epoch per second, the nodes remain in-network and do not have to reacquire the network when network traffic increases. This avoids a significant time penalty as compared to power management techniques where a node leaves the network for periods of time.

The reduction of wasted power enhances the ability of the wireless mobile nodes to remain in-network performing their assigned role. By reducing wasted power, battery life can be extended. Therefore, savings is achieved in terms of size and weight of the wireless mobile nodes since less batteries and/or smaller batteries can be used. Additionally, a reduction in power consumption reduces a node's thermal signature thereby increasing its operating life and making it less detectable to thermal imaging systems.

Although the preferred embodiments of the invention have been illustrated and described in detail, it will be readily apparent to those skilled in the art that various modifications may be made therein without departing from the spirit of the invention or from the scope of the appended claims. For example, the order of tasks can be varied greatly from that which was presented. In addition, the particular bandwidth management messages can be varied in accordance with the characteristics of a particular wireless ad hoc network.

What is claimed is:

1. A method of power management in a wireless ad hoc network, said network including a plurality of nodes, and said method comprising:
   monitoring a current traffic load of said wireless ad hoc network, wherein said current traffic load is a first traffic load determined at a first instant in time;
   in response to said first traffic load, selecting a first subset of epochs within a time window of epochs for network communication;
   communicating a message between said nodes in said network, said message identifying said first subset of epochs as being allowable for use in communicating network traffic;
   following receipt of said message, said each of said nodes modifying a transmit capability mode by entering a run state to enable communication of said network traffic over said network during said epochs within said first subset of epochs and by entering an idle state during remaining ones of said epochs within said time window;
   detecting a second current traffic load at a second instant in time following said first instant in time;
   adjusting said first subset of epochs to form a second subset of epochs within said time window in response to said second current traffic load;
   communicating a second message between said nodes in said network, said second message identifying said second subset of epochs as being allowable for use in communicating said network traffic; and
   following receipt of said second message, said each of said nodes modifying said transmit capability mode by entering said run state to enable communication of said network traffic during said epochs within said second subset of epochs and by entering said idle state during remaining ones of said epochs within said time window.

2. A method as claimed in claim 1 wherein said time window is one of cyclically repeated time windows, each of said cyclically repeated time windows comprising said epochs, and said method further comprises:
   communicating said network traffic during said epochs within said first subset of epochs for said each of said cyclically repeated time windows; and
   abstaining from communicating said network traffic during said each of said cyclically repeated time windows when said each of said nodes is in said idle state.

3. A method as claimed in claim 1 further comprising:
comparing said second current traffic load with one of a high traffic load threshold and a low traffic load threshold;
said adjusting operation increases a second quantity of said epochs within said second subset of epochs relative to a first quantity of said epochs within said first subset of epochs when said second current traffic load is greater than said high traffic load threshold; and
said adjusting operation decreases said second quantity of said epochs within said second subset of epochs relative to said first quantity of said epochs within said first subset of epochs when said second current traffic load is less than said low traffic load threshold.

4. A method as claimed in claim 3 further comprising:
detecting a mobility characteristic for said each of said nodes, said mobility characteristic being one of a substantially static characteristic and a mobile characteristic;
said adjusting operation increases said second quantity of said epochs within said second subset of epochs when said second current traffic load is greater than said high traffic load threshold and said mobility characteristic for at least some of said nodes is said mobile characteristic; and
said adjusting operation decreases said second quantity of said epochs within said second subset of epochs when said second current traffic load is less than said low traffic load threshold and said mobility characteristic for said at least some of said nodes is said substantially static characteristic.

5. A method as claimed in claim 1 wherein:
said adjusting operation increases a second quantity of said epochs within said second subset of epochs relative to a first quantity of said epochs within said first subset of epochs; and
said modifying operation modifies said transmit capability mode in accordance with an aggressive recovery policy, said aggressive recovery policy enabling said network communication during said second subset of epochs in accordance with a rapid increase characteristic of said aggressive recovery policy.

6. A method as claimed in claim 1 wherein:
said adjusting operation decreases a second quantity of said epochs within said second subset of epochs relative to a first quantity of said epochs within said first subset of epochs; and
said modifying operation modifies said transmit capability mode in accordance with a gradual decay policy, said gradual decay policy enabling said network communication within said second subset of epochs in accordance with a gradual decrease characteristic of said gradual decay policy.

7. A method as claimed in claim 1 wherein said selecting operation comprises selecting at least two of said epochs within said time window for inclusion in said first subset of epochs, said at least two of said epochs being immediately adjacent one another within said time window of said epochs.

8. A method as claimed in claim 1 wherein said selecting operation comprises selecting at least two of said epochs within said time window for inclusion in said first subset of epochs, said at least two of said epochs being approximately uniformly distributed within said time window of said epochs.

9. A method as claimed in claim 1 wherein said one of said nodes is a network manager, and said monitoring, selecting and communicating operations are performed by said network manager.

10. A method as claimed in claim 1 wherein said monitoring and selecting operations are performed by said each of said nodes, and said communicating operation comprises:
communicating a plurality of management messages between said nodes, said plurality of management messages including nodal traffic loads; and
said selecting operation comprises collectively selecting said first subset of epochs for communication of said network traffic in response to said nodal traffic load, said collectively selecting being performed by common consent between said nodes within said ad hoc network.

11. A method of power management in a wireless ad hoc network, said network including a plurality of nodes, and said method comprising:
monitoring a current traffic load of said wireless ad hoc network;
in response to said current traffic load, selecting a first subset of epochs within a time window of epochs for network communication;
communicating a message between said nodes in said network, said message identifying said first subset of epochs as being allowable for use in communicating network traffic;
following receipt of said message, said each of said nodes modifying a transmit capability mode by entering a run state to enable communication of said network traffic over said network during said epochs within said first subset of epochs and by entering an idle state during remaining ones of said epochs within said time window;
determining a priority characteristic of said network traffic;
adjusting said first subset of epochs to form a second subset of epochs within said time window in response to said priority characteristic;
communicating a second message between said nodes in said network, said second message identifying said second subset of epochs as being allowable for use in transmitting said network traffic; and
following receipt of said second message, each of said nodes modifying said transmit capability mode by enabling communication of said network traffic during said second subset of epochs and entering said idle state during said remaining ones of said epochs.

12. A method as claimed in claim 11 wherein:
when said priority characteristic of said network traffic is greater than a high priority threshold, increasing a second quantity of said epochs within said second subset of epochs relative to a first quantity of said epochs within said first subset of epochs for communication of said network traffic; and
when said priority characteristic of said network traffic is less than a low priority threshold, decreasing said second quantity of said epochs within said second subset of epochs relative to said first quantity of said epochs within said first subset of epochs for communication of said network traffic.

13. A method as claimed in claim 11 wherein said priority characteristic is a latency characteristic of said network traffic, and said method further comprises:
determining that said latency characteristic calls for minimal latency in transmission of said network traffic; and increasing a second quantity of said epochs in said second subset of epochs relative to a first quantity of said epochs within said first subset of epochs for communication of said network traffic.

14. A wireless ad hoc network comprising:
a plurality of wireless nodes configured for network communication, each of said wireless nodes being capable of functioning in either of an operational mode and a sleep mode, wherein said operational mode includes a run state and an idle state, said each wireless node consuming less power in said idle state than in said run state;
a processor for managing power consumption of said nodes in said wireless ad hoc network; and
a computer-readable storage medium containing executable code for instructing said processor to perform operations comprising:
monitoring a current traffic load of said wireless ad hoc network, wherein said current traffic load is a first traffic load determined at a first instant in time;
in response to said current traffic load, selecting a first subset of epochs within a time window of epochs for network communication;
communicating a message between said nodes in said network, said message identifying said first subset of epochs as being allowable for use in communicating network traffic, wherein following receipt of said message, said each of said nodes modifies its transmit capability mode by entering said run state to enable communication of said network traffic over said network during said epochs within said first subset of epochs and by entering said idle state during remaining ones of said epochs within said time window;
detecting a second current traffic load at a second instant in time following said first instant in time;
adjusting said first subset of epochs to form a second subset of epochs within said time window in response to said second current traffic load;
communicating a second message between said nodes in said network, said second message identifying said second subset of epochs as being allowable for use in communicating said network traffic; and
following receipt of said second message, said each of said nodes modifies its said transmit capability mode by entering said run state to enable communication of said network traffic during said epochs within said second subset of epochs and by entering said idle state during said remaining ones of said epochs within said time window.

15. A wireless ad hoc network as claimed in claim 14 wherein said processor and said executable code are incorporated in each of said nodes, and said executable code instructs said processor at said each node to perform further operations comprising:
communicating a plurality of management messages between said nodes, said plurality of management messages including nodal traffic loads; and
said selecting operation comprises collectively selecting said first subset of nodes for communication of said network traffic in response to said nodal traffic load, said collectively selecting being performed by common consent between said nodes within said wireless ad hoc network.

16. A method of power management in a wireless ad hoc network, said network including a plurality of nodes, and said method comprising:
monitoring a first traffic load of said wireless ad hoc network at a first instant in time;
in response to said first traffic load, selecting a first subset of epochs within a time window of epochs for network communication;
communicating a message between said nodes in said network, said message identifying said first subset of epochs as being allowable for use in communicating network traffic;
following receipt of said message, said each of said nodes modifying a transmit capability mode by entering a run state to enable communication of said network traffic over said network during said epochs within said first subset of epochs and by entering an idle state during remaining ones of said epochs within said time window;
detecting a second traffic load and a priority characteristic of said network traffic at a second instant in time following said first instant in time;
adjusting said first subset of epochs to form a second subset of epochs within said time window in response to said second current traffic load and said priority characteristic;
communicating a second message between said nodes in said network, said second message identifying said second subset of epochs as being allowable for use in communicating said network traffic; and
following receipt of said second message, said each of said nodes modifying said transmit capability mode by entering said run state to enable communication of said network traffic during said epochs within said second subset of epochs and by entering said idle state during said remaining ones of said epochs within said time window.

17. A method as claimed in claim 16 further comprising
comparing said second current traffic load with one of a high traffic load threshold and a low traffic load threshold;
said adjusting operation increases a second quantity of said epochs within said second subset of epochs relative to a first quantity of said epochs within said first subset of epochs when said second current traffic load is greater than said high traffic load threshold; and
said adjusting operation decreases said second quantity of said epochs within said second subset of epochs relative to said first quantity of said epochs within said first subset of epochs when said second current traffic load is less than said low traffic load threshold.

18. A method as claimed in claim 16 wherein said priority characteristic is a latency characteristic of said network traffic, and said method further comprises:
determining that said latency characteristic calls for minimal latency in transmission of said network traffic; and
increasing a second quantity of said epochs in said second subset of epochs relative to a first quantity of said epochs within said first subset of epochs for communication of said network traffic.

* * * * *